United States Patent
Oldendorf et al.

(10) Patent No.: US 7,785,477 B2
(45) Date of Patent: Aug. 31, 2010

(54) DEVICE, METHOD AND COMPUTER PROGRAM PRODUCT FOR CARRYING OUT A PROCESS FOR THE FILTRATION OF FLUIDS

(75) Inventors: Christian Oldendorf, Göttingen (DE); Oscar-Werner Reif, Hannover (DE); Maik Jornitz, Bellport, NY (US)

(73) Assignee: Sartorius Stedim Biotech GmbH (DE)

( * ) Notice: Subject to any disclaimer, the term of this patent is extended or adjusted under 35 U.S.C. 154(b) by 0 days.

(21) Appl. No.: 12/380,732

(22) Filed: Mar. 3, 2009

(65) Prior Publication Data

US 2009/0188871 A1 Jul. 30, 2009

Related U.S. Application Data

(63) Continuation of application No. 10/492,810, filed as application No. PCT/EP02/13118 on Nov. 22, 2002, now abandoned.

(51) Int. Cl.
*B01D 37/00* (2006.01)
(52) U.S. Cl. ............... 210/739; 95/1; 95/25; 210/767; 700/108; 700/273; 702/182; 705/305
(58) Field of Classification Search ............ 210/85–91, 210/94, 96.1, 101, 106, 137, 141, 143, 739, 210/767; 96/413, 417–422, 424, 425; 95/1, 95/25; 700/32, 33, 36, 81, 85, 108–110, 700/273, 275, 282; 702/182–185; 705/1.1, 705/28, 29, 302, 305, 308
See application file for complete search history.

(56) References Cited

U.S. PATENT DOCUMENTS

| 5,581,459 | A | * | 12/1996 | Enbutsu et al. | ............... | 700/32 |
| 5,674,381 | A | * | 10/1997 | Den Dekker | ............... | 210/85 |
| 5,814,214 | A | * | 9/1998 | Chun | ............... | 210/130 |
| 6,051,144 | A | * | 4/2000 | Clack et al. | ............... | 210/739 |
| 6,286,363 | B1 | * | 9/2001 | Discenzo | ............... | 73/53.01 |
| 6,408,227 | B1 | * | 6/2002 | Singhvi et al. | ............... | 700/266 |
| 6,537,444 | B2 | * | 3/2003 | Wilberscheid et al. | ........ | 210/85 |
| 6,546,785 | B1 | * | 4/2003 | Discenzo | ............... | 73/53.05 |
| 6,551,503 | B2 | * | 4/2003 | Niers et al. | ............... | 210/85 |
| 6,558,444 | B1 | * | 5/2003 | Hunter | ............... | 55/385.1 |

(Continued)

FOREIGN PATENT DOCUMENTS

GB      2303082      *    2/1997

*Primary Examiner*—Joseph W Drodge
(74) *Attorney, Agent, or Firm*—Gerald E. Hespos; Michael J. Porco

(57) ABSTRACT

The invention relates to a filtration system and method for carrying out a process for the filtration of fluids, comprising at least one filtration device with at least one filtration element comprising readable data and a check and/or test apparatus to which the filtration device may be connected, by means of data and testing means lines. The check and/or testing device is connected to a process controller, by data exchange means, for regulation and control of the filtration process and the process controller is connected to a filtration databank, by means of data exchange means, which comprises data sets for at least one filter element and/or for each filtration device and/or for the filtration process. The invention further relates to a computer program product for carrying out a filtration process on fluids whereby program components may be called up from a program memory which support the carrying out of the filtration process.

5 Claims, 3 Drawing Sheets

U.S. PATENT DOCUMENTS

Figure 1:
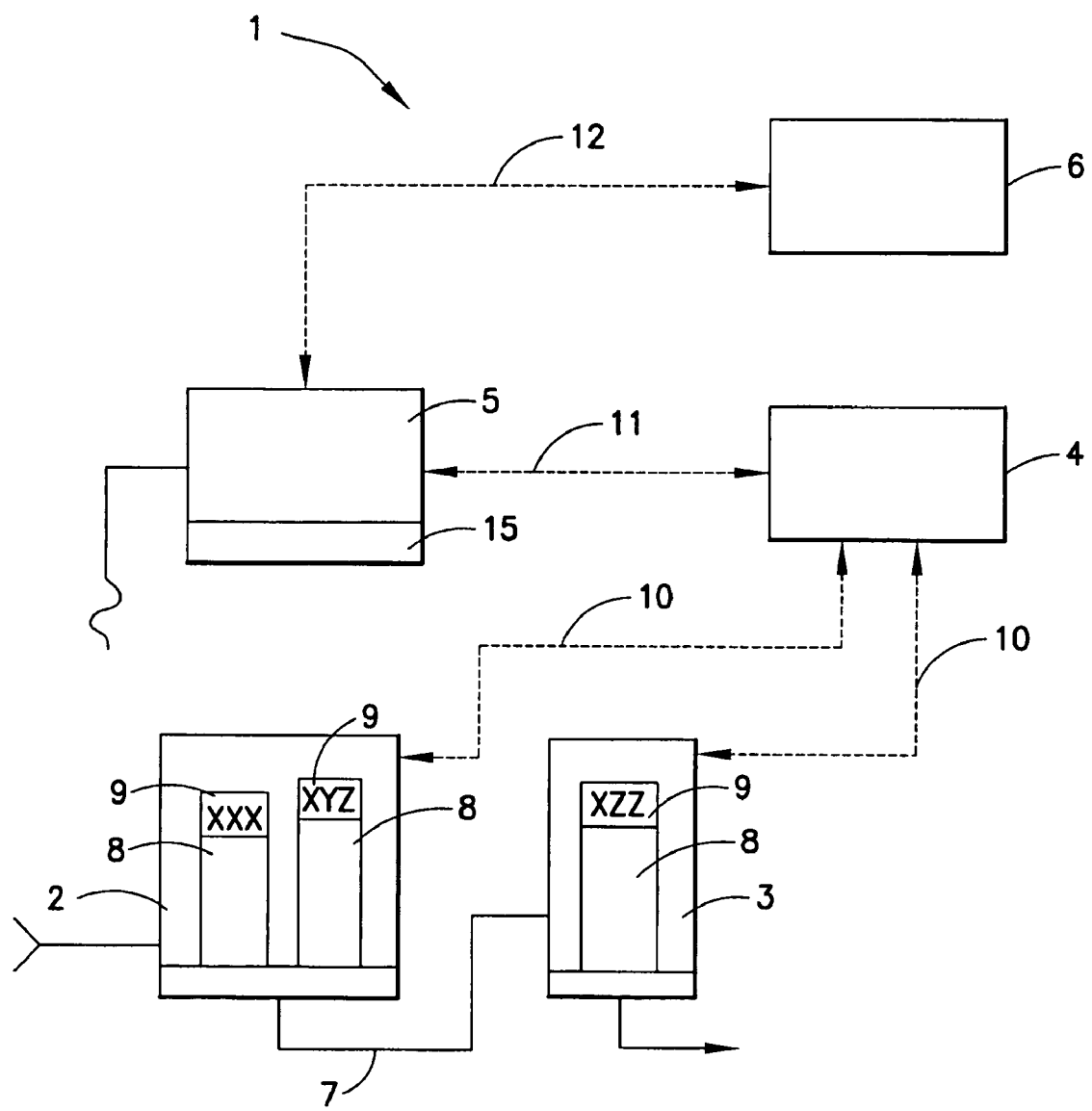

| | | | |
|---|---|---|---|
| 6,560,543 B2 * | 5/2003 | Wolfe et al. | 702/22 |
| 6,636,151 B2 * | 10/2003 | Busick | 340/521 |
| 6,711,524 B2 * | 3/2004 | Wolf et al. | 702/182 |
| 7,048,775 B2 * | 5/2006 | Jornitz et al. | 95/1 |
| 7,281,409 B2 * | 10/2007 | Baumfalk et al. | 73/38 |
| 7,360,400 B2 * | 4/2008 | Baumfalk et al. | 73/38 |
| 2002/0082746 A1 * | 6/2002 | Schubring et al. | 700/275 |

* cited by examiner

DEVICE, METHOD AND COMPUTER PROGRAM PRODUCT FOR CARRYING OUT A PROCESS FOR THE FILTRATION OF FLUIDS

This is a continuation application of U.S. patent application Ser. No. 10/492,810 filed Apr. 14, 2004, now abandoned, which is a 371 of Application PCT/EP02/13118, filed Nov. 22, 2002.

The invention relates to an apparatus for carrying out a filtration process for fluids, comprising at least one filtration apparatus having at least one filter element that has legible data, a monitoring and/or test set to which the filtration apparatuses can be connected via data and test equipment lines.

The invention also relates to a method for carrying out a filtration process for fluids via filter elements which are located in filtration apparatuses, in which at least a minimum amount of identification data is supplied to a monitoring and/or test set.

The invention likewise relates to a computer program product for carrying out a filtration process for fluids.

A filtration system for carrying out a filtration process is known from EP 0 700 313 B1. The filtration system comprises a filtration apparatus having a filter element, which has legible data, and a monitoring appliance, to which the filtration apparatus can be connected via data and test equipment lines. The legible data is arranged on an electronic label, whose data can be read by a reading device, which is adjacent to the electronic label, and can be supplied to the monitoring unit. The aim of this is to identify in particular whether a specified filter has been installed. Provision is also made for the number of operating hours of the filter to be stored and for the filtration appliance or filtration system to be switched off when the maximum permissible number of operating hours has been reached. The electronic label and the reading device form an electronic identification system, in an interactive version of which data for the filtration appliance is stored in the label.

The known filtration system has the disadvantage that, even as an interactive system, it is essentially restricted to the checking of the filter elements. No provision is therefore made for complete monitoring of the filtration process in the known filtration system.

Another disadvantage is that, when using an interactive system, the electronic label or each filter element must be equipped with a memory. This on the one hand increases the price of the filter elements and on the other hand only a restricted amount of memory space can be made available.

The object of the present invention is thus to provide a filtration system in which, on the one hand, the entire filtration process, and, on the other hand, the filter elements and/or the filtration apparatuses, can be monitored in a financially worthwhile and cost-effective manner.

This object is achieved in conjunction with the precharacterizing clause of claim 1 in that the monitoring and/or test set can be connected via data interchange means to a process control device for closed-loop and open-loop control of the filtration process, and in that the process control device can be connected via data interchange means to a filter element database, which has data records for at least each filter element and/or each filtration apparatus and/or for the filtration process.

Since the monitoring and/or test set can be connected to a process control device for closed-loop and open-loop control of the filtration process, the entire filtration process can be monitored and controlled. Since the process control device can be connected to a filter element database, the filter elements and the filtration apparatuses need only be identified. There is therefore no need for a complex and relatively expensive memory element directly with the filter elements. After identification of the respective filter elements or filtration apparatuses, the data which is required for monitoring can be obtained easily, cost-effectively and reliably from the filter element database. One particular advantage is that only one filter element database is required. It is even possible to arrange just one single filter element database centrally at the manufacturer's premises.

According to one preferred embodiment of the invention, the process control device has an electrical memory element which can be associated with each filtration apparatus and in which data can be stored for each of the filter elements of the filtration apparatuses and/or the filtration process to be carried out. The data which has been read from the filter element database can be stored in the electronic memory element, and can be associated with the filter elements or filtration apparatuses. It is also possible to store new data determined while the filtration process is taking place.

According to a further preferred embodiment of the invention, the legible data for the filter elements represents at least individualizing identification data for the filter element. The identification data may in this case be legible or be read visually and/or by machine. If read visually, the identification data must be entered manually, so that input errors may occur. If the identification data is machine-legible, transmission errors are avoided.

Identification data may comprise numbers or letters or alphanumeric characters and/or bar codes and/or data matrices and/or electronic elements. It is also possible for the electronic elements to be in the form of transponders. An external filter element database (which is arranged, for example, at the manufacturer's premises) has the advantage that it is always up-to-date and the latest knowledge can be included in the filtration process. However, it is also possible to arrange the filter element database in the monitoring and/or test set or in the process control device, and to integrate it in this device. This database can then be updated with the aid of data from an external database.

According to a further preferred embodiment of the invention, the data records in the filter element database comprise identification data, limiting data and product release data for each of the filter elements and/or the filtration apparatus and/or for the filtration process. In this case, article numbers and individual numbers for the filter elements and for the filtration apparatuses as well as codes for the filtration process are used as identification data. Integrity data for the filter elements, temperature details, pressure details, pH values, a substance concentration, flow details, operating times, life, flow rates for fluid to be filtered or for filtrate, the number of permissible sterilization and/or cleaning cycles of the filtration process can be used as limiting data. At the same time, integrity data, determined by the manufacturer for the filter elements can be used as product release data. The large number of data items which can be used allow complex and reliable monitoring of the filtration process.

According to a further preferred embodiment of the invention, the data interchange means, that is to say in particular the connection between the process control device and the filter element database, represents a data network. An intranet or the Internet may be used, in particular, in this case as the data network. Beams, in particular light beams, infrared beams or radio-frequency beams, may also be used as the data interchange means. It is also possible to use mobile data storage media for interchanging data.

Filter cartridges, filter capsules, filter cassettes, filter winding modules, flat filter elements or combinations of them may be used, in particular, as the filter elements.

The known methods for carrying out a filtration process for fluids have the disadvantages mentioned above.

A further object of the invention is therefore to improve the known methods such that cost-effective and reliable monitoring of a filtration process can be carried out.

This object is achieved in that the filtration process is started, is carried out and/or is stopped on reaching a limiting data item via a process control device, which is connected to the monitoring and/or test set by supplying the identification data, by providing limiting data and product release data from a filter element database and by determining integrity and/or filtration process data while carrying out the filtration process and by comparison of the data.

The supply and reading of the identification data and limiting data associated with the identification data, and product release data from the filter element database, in conjunction with the determination of integrity and/or filtration data while carrying out the filtration process ensure that the filtration process is carried out in a complex, reliable manner.

Since the filter elements, which have to be replaced frequently, need be directly associated only with identification data, the method can at the same time be carried out cost-effectively.

According to one preferred embodiment of the invention, the method for carrying out a filtration process is carried out in the following steps:

a) the individualizing identification data for each filter element for each filtration apparatus and/or identification data for the filtration process to be carried out are/is entered in the process control device, b) the identification data according to a) is transferred to the filter element database and a check is carried out to determine whether the filter elements and/or filtration apparatuses specified or permissible for the filtration process have been selected, and whether the filter elements and/or the filtration apparatus have/has been released for this purpose, c) the filtration system is inhibited if at least one filter element and/or one filtration apparatus has been chosen incorrectly or if at least one filter element is inhibited, d) limiting data and product release data for each of the filter elements for each filtration apparatus and/or each filtration apparatus and/or for the filtration process are called up from the filter element database by the process control device, and this data is entered, or is added and entered, in the electrical memory element that is associated with the respective filtration apparatus for storage of limit values and product release values for process data and/or integrity data, e) permissible tolerance values are determined and stored, f) the filtration process is started by the process control device, g) process data and/or integrity data are/is measured by the monitoring and/or test set and this data is entered, or is added and entered, in the respective memory element, h) a comparison process is carried out to determine whether the measured process data and/or integrity data or their/its sums exceed/exceeds one of the permissible tolerance values, i) the filtration process is terminated and the filtration system is inhibited when one of the tolerance values is reached or exceeded and the filter elements in the filter element database are inhibited.

The association of identification data and corresponding data in the filter element database reliably ensures that filter elements and/or filtration apparatuses which are not permissible are identified and that the filtration system is inhibited. Calling up limiting data and product release data makes it possible to check whether limiting data has already been reached, so that the filtration process can be inhibited even before it is actually started. The association of identification data with the filter elements and process data makes it possible to determine and to store the permissible tolerance values even before the actual filtration process is started, so that this data is available for the monitoring of the filtration process. Measurement of the process and integrity data as well as entering and adding this data in the appropriate memory element allow the specific process and/or integrity data to be easily compared with the permissible tolerance values, and the filtration system to be inhibited if the permissible tolerance values are exceeded. The storage of the current process data and the filter element database reliably avoid filter elements and filtration apparatuses which have exceeded the permissible tolerance values possibly being used again.

According to a further preferred embodiment of the invention, the current process data is stored as a record in the filter element database.

The recording of the current process data makes it possible to understand relatively easily why permissible tolerance values have been exceeded and the filtration system has been inhibited.

A further object of the invention is to propose a computer program product for carrying out a filtration process.

This object is achieved in that program parts can be called up from a program memory and assist the process of carrying out the filtration process.

Since the supporting program parts can be called up from a program or program memory, this considerably simplifies the design of an appropriate apparatus and the method.

According to one preferred embodiment of the invention, program parts can be called up from the program memory which assist the communication between the filter elements and/or the filtration apparatuses and the monitoring and/or test set and/or a process control device and/or the filter element database.

The program parts which assist communication allow and speed up the automatic communication in particular between the filter elements and the process control device and the filter element database even when a large amount of data has to be interchanged.

Further preferred embodiments are described in the dependent claims.

Figure 2:
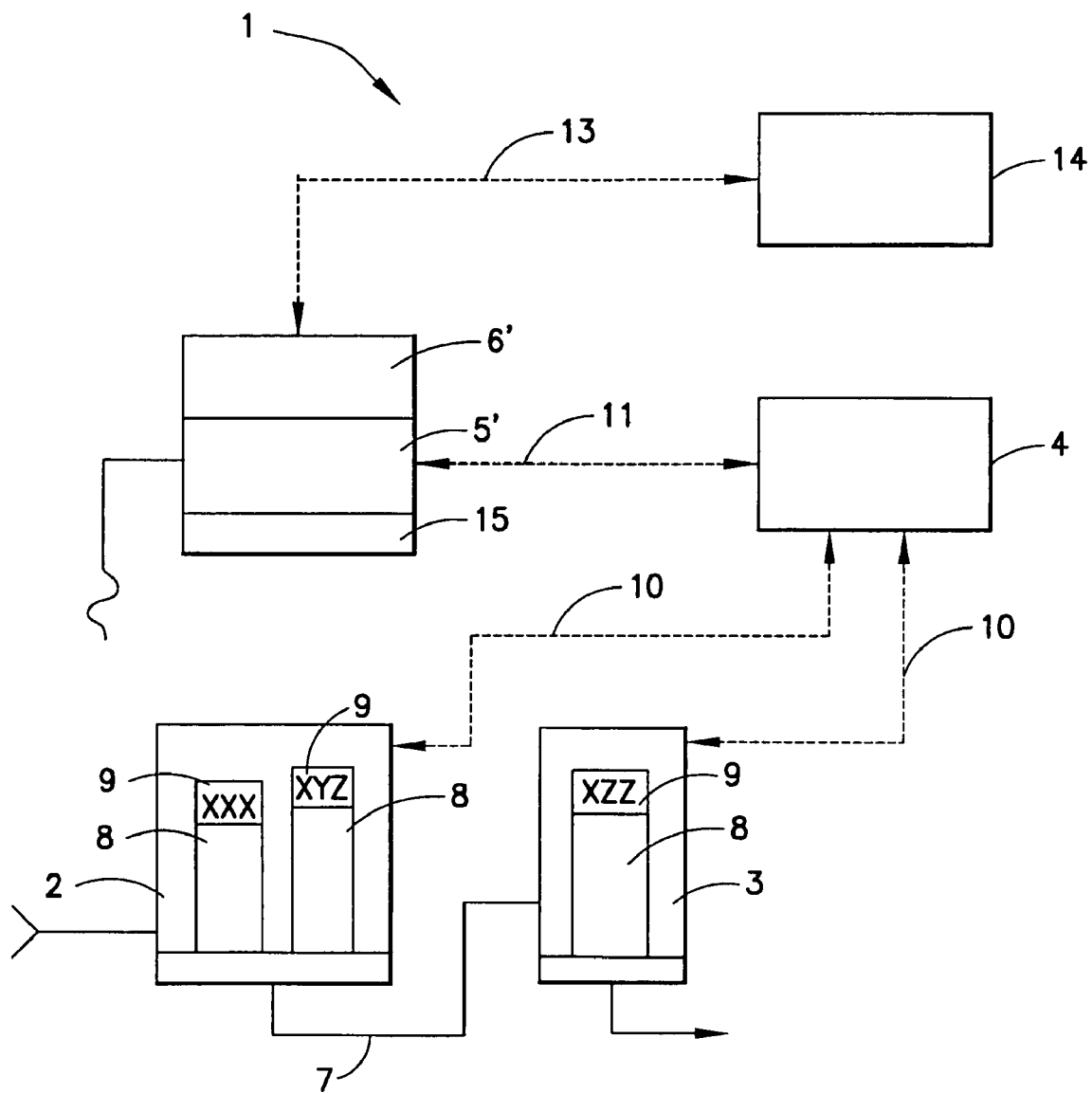
Figure 3:
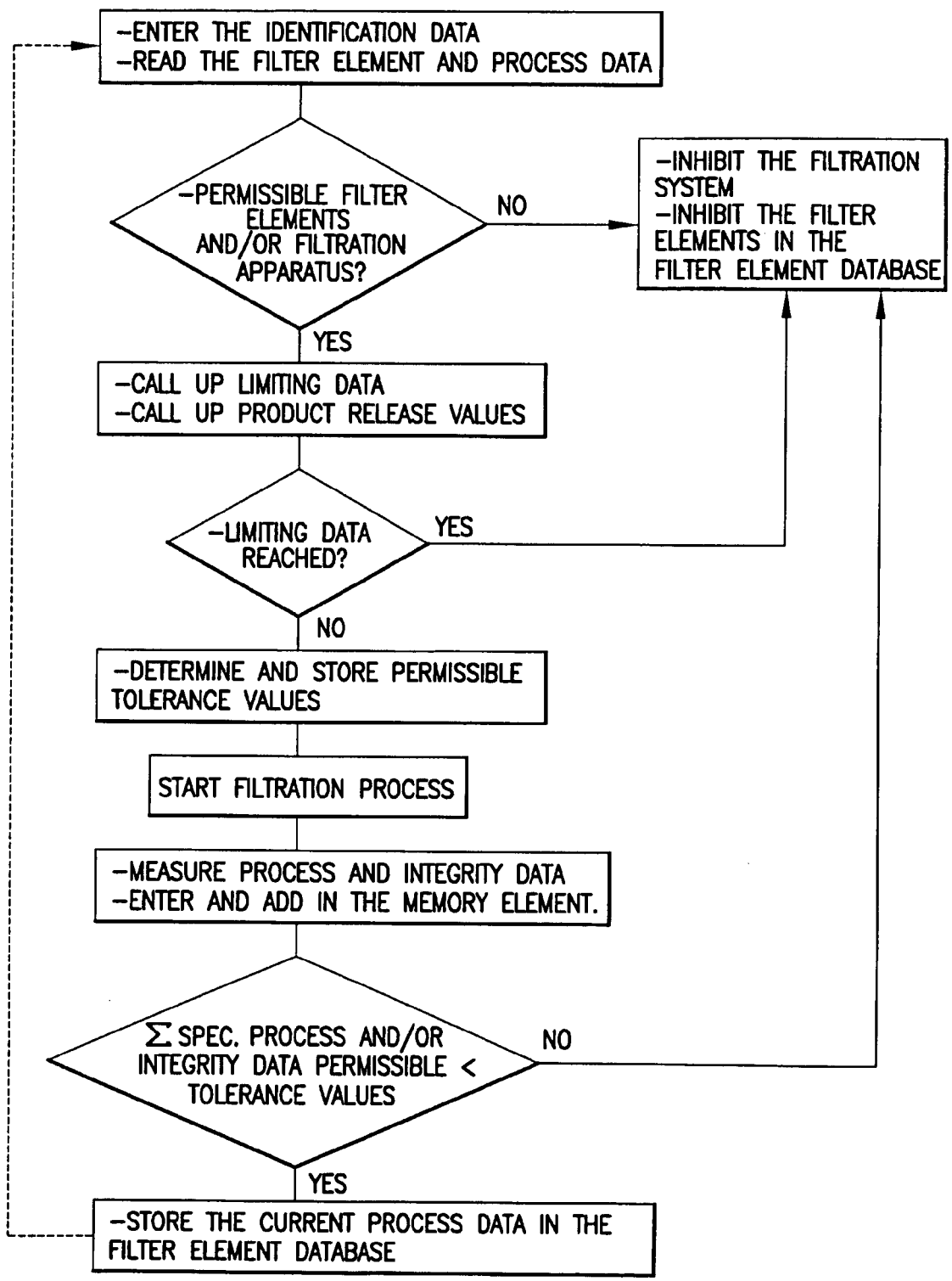

Further details of the invention will become evident from the following comprehensive description and from the attached drawings, which illustrate preferred embodiments of the invention by way of example, and in which:

FIG. 1 shows a schematic illustration of an apparatus for carrying out a filtration process for fluids with an external filter element database, FIG. 2 shows a schematic illustration of an apparatus for carrying out a filtration process for fluids, with a filter element database which is integrated in a process control device and with an external database, and FIG. 3 shows a schematic illustration of a method procedure for carrying out a filtration process.

A filtration system 1 for carrying out a filtration process for fluids essentially comprises filtration apparatuses 2, 3, a monitoring and/or test set 4, a process control device 5 and a filter element database 6.

The first filtration apparatus 2 and the second filtration apparatus 3 are connected in series and are connected to one another via a fluid line 7. Depending on the filtration process, one or more filtration apparatuses 2, 3 may be used, or may be connected in series or else in parallel. In the example, the first filtration apparatus 2 has two filter elements 8. The filtration apparatus 3 has one filter element 8. The filter elements 8 may be same or may differ. At their upper end, the filter elements 8 have legible data 9, which is read by a reader that is not illustrated. The reader that is not illustrated passes on the legible data 9 via the monitoring and/or test set 4 to the process control device 5.

The filtration apparatuses 2, 3 are connected via data and test equipment lines 10 to the monitoring and/or test set 4. The monitoring and/or test set 4 is connected to the process control device 5 via data interchange means 11. As is shown in FIG. 1, the process control device 5 is connected to the filter element database 6 via data interchange means 12. The filter element database 6 is in the form of an external database, as shown in FIG. 1. A data or computer network is used as the data interchange means.

As is shown in FIG. 2, the filter element database 6' is integrated in the process control device 5'. The filter element database 6' may in particular be connected to an external database 14 via data interchange means 13.

The process control device 5, 5' provides closed-loop and open-loop control for the filtration process via control lines, which are not illustrated, and actuating and control elements. The process control device 5 has an electronic memory element 15, which can be associated with each filtration apparatus 2, 3 and each filter element 8 and in which data can be stored for the respective filter elements 8 of the filtration apparatuses 2, 3 and/or for the filtration process to be carried out.

In order to carry out the method, the identification data which is arranged on the filter elements 8 is entered in the memory element 15. Furthermore, the filter element and process data from the filter element database 6, 6' is entered in the memory element 15. The process control device 5, 5' then checks whether permissible filter elements 8 and/or filtration apparatuses 2, 3 are being used. If filter elements 8 or filtration apparatuses 2, 3 which are not permissible are being used, the filtration system 1 is inhibited, and the filter elements 8 and/or the filtration apparatuses 2, 3 are identified in the filter element database 6, 6' as being inhibited. If they are being used permissibly, the limiting data and product release values are called from the filter element database 6, 6' and/or from the electronic memory element 15. If any limiting data has been reached, the filtration system is inhibited, and the fact that the limiting data has been reached is stored in the filter element database 6, 6'.

If the limiting data has not been exceeded, the permissible tolerance values are determined and are stored in the electronic memory element 15. The filtration process is then actually started. Controlled by the process control device 5, the process and integrity data is measured and is entered and added in the electronic memory element 15. If the sum of the specific process and/or integrity data exceeds the permissible tolerance values, the filtration system 1 is inhibited, and the fact that the filtration system 1 and/or the filter elements 8 has or have been inhibited is stored in the filter element database 6, 6'. The current process data is likewise stored in the filter element database 6, so that, if the filtration process is carried out more than once, it is possible to access the most recent, current process data in the filter element database 6, 6'.

The process control device 5 is associated with a computer program product for carrying out the filtration process, in which program parts can be called up from a program memory, which is not illustrated, to assist the process of carrying out the filtration process and/or the method for carrying out a filtration process.

The invention claimed is:

1. A method for carrying out a filtration process for fluids via filter elements wherein said filter elements are located in a filtration system (1), and wherein the following steps are carried out:
   a) identification data for:
      (i) at least one filter element (8),
      (ii) at least one filtration apparatus (2, 3) having the filter elements, and
      (iii) a filtration process to be carried out with the filter elements and the filtration apparatus; are entered in a process control device (5, 5') which is external to said filter element (8),
   b) the identification data according to a) is transferred to a filter element database (6, 6'), which is external to said filter element (8) and connected to an external database (14), and a check is carried out to determine whether (i) filter element (8), (ii) filtration apparatus (2, 3), and (iii) said filtration process to be carried out, have been correctly selected, and whether the filter element (8) and the filtration apparatus (2, 3) are correct for the filtration process,
   c) the filtration system (1) is inhibited if
      (i) at least one filter element (8) or one filtration apparatus (2, 3) has been chosen incorrectly, or
      (ii) if at least one filter element (8) is inhibited,
   d) limiting data and product release data comprising process data and integrity data for each of the filter elements (8) for each filtration apparatus (2, 3) and for the filtration process are called up from the filter element database (6, 6') and external database (14) by the process control device (5, 5'), and this data is entered, or is added and entered, in an electronic memory element (15) which is external to said filter element (8) and is associated with the respective filtration apparatus (2, 3) for storage of limit values and product release values for process data and integrity data,
   e) permissible tolerance values are determined and stored,
   f) the filtration process is started by the process control device (5, 5'),
   g) the process data and integrity data are measured by a monitoring and/or test set (4) and this data is entered, or is added and entered, in the respective memory element (15),
   h) a comparison process is carried out by said process control device (5, 5') to determine whether measured process data and integrity data or their sum exceeds permissible tolerance values, and
   i) the filtration process is terminated and the filtration system (1) is inhibited when one of said tolerance values is reached or exceeded and the filter elements (8) are inhibited.

2. The method as claimed in claim 1, wherein the identification data is entered into the control device (5, 5') by a reader.

3. The method as claimed in claim 1, wherein a connection for an external database (14) is made via a data network.

4. The method as claimed in claim 1, wherein the filter element database (6, 6') is connected to a mobile data storage medium in order to interchange data.

5. The method as claimed in claim 1, wherein current process data is stored as a record in the filter element database (6, 6').

* * * * *